UNITED STATES PATENT OFFICE.

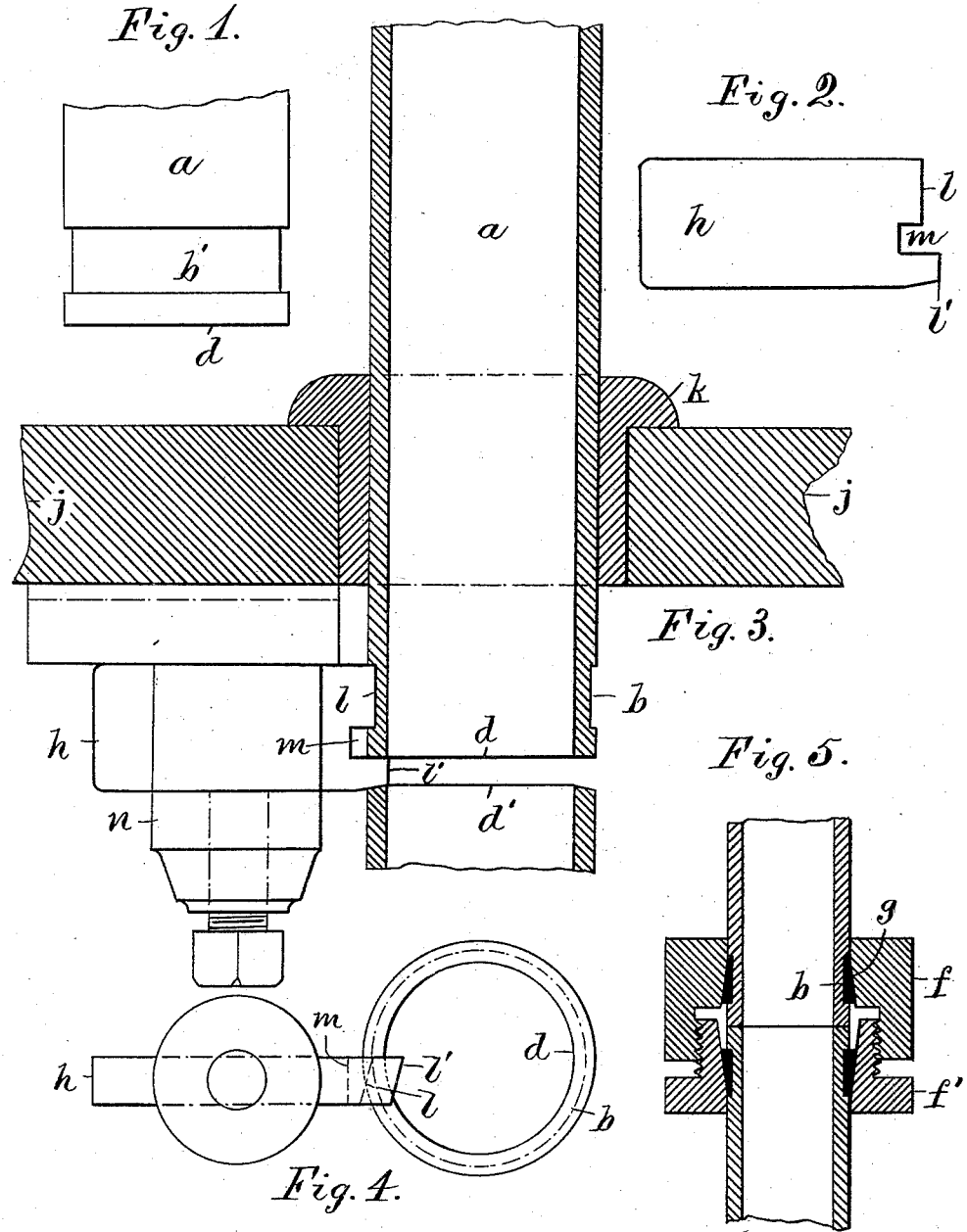

JOHN J. HOGAN, OF BROOKLYN, ASSIGNOR TO THE HOGAN ENGINEERING COMPANY, OF NEW YORK, N. Y.

PIPE-TURNING TOOL.

SPECIFICATION forming part of Letters Patent No. 473,877, dated April 26, 1892.

Application filed June 15, 1891. Serial No. 396,350. (No model.)

*To all whom it may concern:*

Be it known that I, JOHN J. HOGAN, a citizen of the United States, residing at Brooklyn, Kings county, New York, have invented certain new and useful Improvements in Pipe-Turning Tools, fully described and represented in the following specification and the accompanying drawings, forming a part of the same.

The object of this invention is to provide pipe ends with a groove at a uniform distance from the end of the pipe for use with interchangeable couplings fitted to such grooves. The tool may be adapted to simultaneously cut off the pipe and to turn the required groove in the surface of the pipe near its end, or it may be used merely to form the groove and gage the distance of the groove from the end of the pipe. Such grooved pipe ends are adapted for use with the coupling claimed patent application Serial No. 277,111, filed in July 23, 1888, by J. J. Hogan.

In the drawings, Figure 1 represents a pipe end with groove finished in the same; Fig. 2, the cutter or tool embodying my invention; Fig. 3, a diagram showing the application of the tool to the pipe; Fig. 4, an end view of the pipe with the cutter applied to the same, and Fig. 5 a longitudinal section of two grooved pipe ends with a coupling applied thereto.

$a$ is the pipe, and $b$ the groove, formed in the same adjacent to the end $d$.

In Fig. 5, $g$ are split collars (with conical exterior) fitted to the grooves $b$ and clamped by coupling-sleeves $f f'$, which are provided with screw-threads for drawing the pipe ends toward one another. A butt-joint is thus formed between the pipe ends, which may be packed with a washer of tin, copper, or other material.

The object of the present invention is to form the groove $g$ in the exterior of the pipe of a uniform width and at a uniform distance from the end of the pipe, for which purpose I have designed the cutter $h$, which is provided with two tongues $l\ l'$, with an intervening notch $m$. The tongue $l$ is formed upon the end as a cutting or turning tool and is made of suitable width to form the groove $b$, while the tongue $l'$ is made of greater length, so as to bear upon the end of the pipe during the formation of the groove, while the notch $m$ determines the distance of the groove from the end $d$ of the pipe.

The tongues $l$ and $l'$ are shown in Fig. 4 beveled to cut the metal, and with such construction the tongue $l'$ may be used as a pipe-cutter to sever the pipe, as in other pipe-cutting devices.

Fig. 3 shows in section a bearing $j$, containing a bush $k$ to center the pipe $a$ during the cutting operation, and $n$ represents a tool-holder, which is movable, as in pipe-cutting machines, and feeds toward the pipe during the cutting operation. The feeding devices are not shown herein, as they are already well known and form no part of the present invention.

The groove is shown finished in Fig. 3, with the tongue $l$ resting in the groove and the tongue $l'$ in contact with the end $d$ of the pipe $a$, while an adjacent pipe end $d'$ is shown in contact with the outer side of the tongue $l'$, as if cut from the end of the pipe $a$.

In operating with a tool thus constructed the pipe would be adjusted in the bushing or carrier $k$ and would be rotated by any suitable means, and the cutter or tool $h$ would then be fed toward the pipe, the tongue $l'$, owing to its shorter length, first penetrating the pipe and operating to cut off and trim the end. The continued movement of the tool would then bring the tongue $l$ against the outside of the pipe and form by a turning operation the groove $b$. The depth of the groove and its resulting diameter in the bottom would be determined by any suitable means to produce uniformity, and thus enable the pipe to couple interchangeably with uniform collars $g$ and sleeves $f f'$. Where it is not desired to use the tongue $l'$ for cutting off the pipe, it could be shorter, as in Fig. 2, and would serve merely as a gage to set the tongue $l$ at the desired distance from the end of the pipe, which would be cut and trimmed evenly before the tool was applied thereto. The pipe would then be placed with the finished end in close contact with the inner side of the tongue $l'$, as shown in Fig. 3, and the groove $b$ cut in the pipe by the tongue $l$, as already described. I prefer, however, to form the tongue *l'* as a cutting-tool, so that it may operate to trim off the end of the pipe, and thus form the same accurately at the required distance of the inner edge of the groove *b*.

The tool may be made to shape the groove *b* to any desired form.

I am aware that a depressed bearing-seat has been formed upon a cutting-tool to gage the depth of the cut; but such bearing-seat performs no function analogous to either of my cutting-tongues.

Having thus set forth the invention, what is claimed herein is—

1. The pipe-turning tool adapted for grooving pipe ends, as herein described, and provided with the tongue *l*, adapted for turning out the groove in the pipe, the tongue *l'*, of greater length, and the intervening notch *m* to gage the distance of the tongue *l* from the end of the pipe, substantially as herein set forth.

2. The pipe-turning tool adapted for grooving pipe ends, as herein described, and provided with the tongue *l*, adapted for turning out the groove in the pipe, the tongue *l'*, of greater length, adapted to cut off the pipe, and the intervening notch *m* for gaging the distance of the tongue *l* from the end of the pipe, substantially as herein set forth.

JOHN J. HOGAN.

In presence of—
L. C. DAWES,
T. S. CRANE.